Sept. 28, 1965  J. P. WOODS  3,209,321
PRODUCTION OF ELECTRICAL CURRENT FROM OSCILLATORY TRACES
Filed Dec. 15, 1961  2 Sheets-Sheet 2
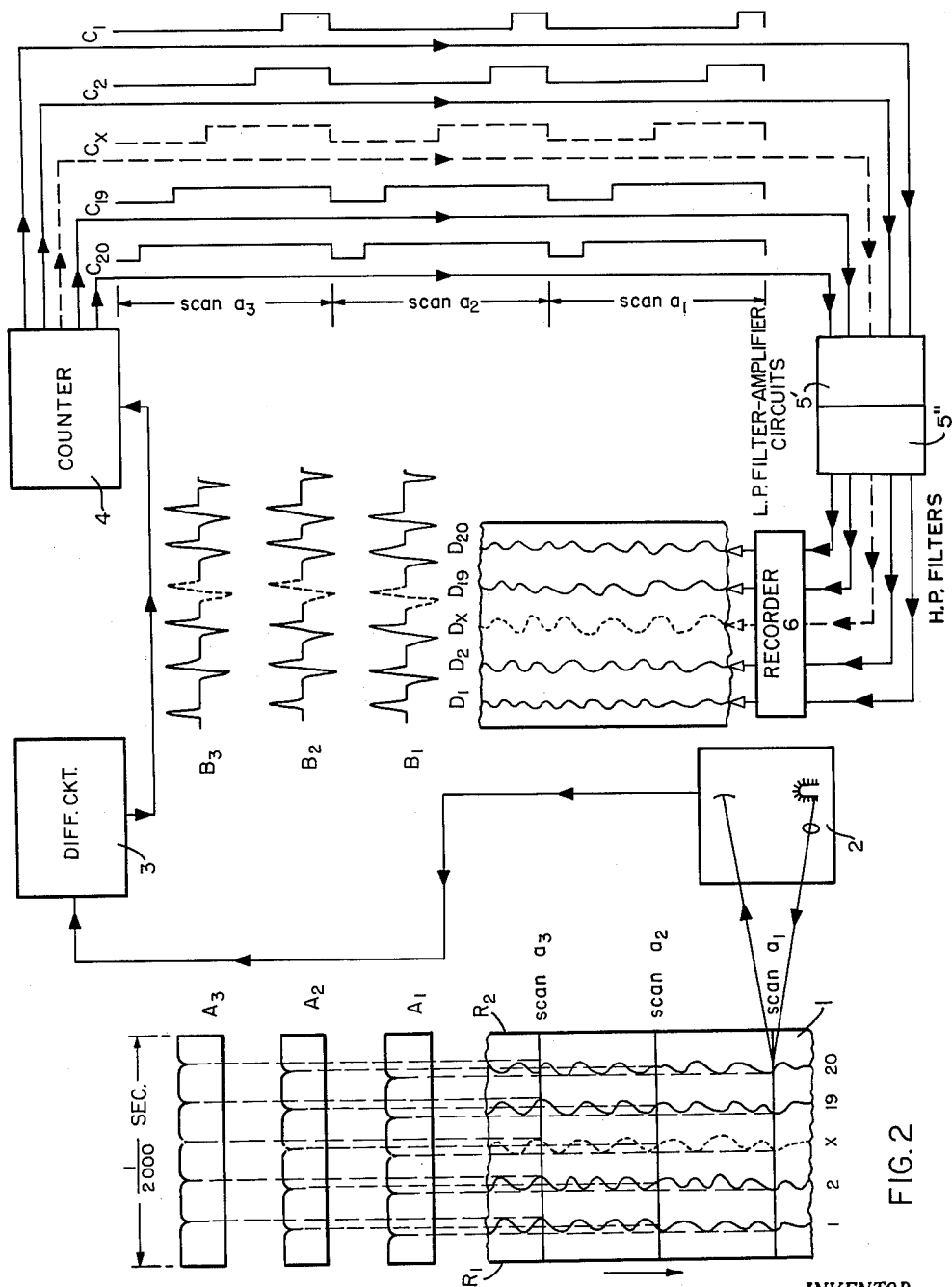
ATTEST
*Charles F. Steininger*
INVENTOR.
John P. Woods
BY *Norbert E. Birch*
ATTORNEY United States Patent Office 3,209,321
Patented Sept. 28, 1965

3,209,321
PRODUCTION OF ELECTRICAL CURRENT FROM OSCILLATORY TRACES
John P. Woods, Dallas, Tex., assignor to The Atlantic Refining Company, Philadelphia, Pa., a corporation of Pennsylvania
Filed Dec. 15, 1961, Ser. No. 159,566
20 Claims. (Cl. 340—15.5)

This application is a continuation-in-part of copending application Serial No. 772,377, filed November 6, 1958, now abandoned by John P. Woods.

The present invention relates to a method and apparatus for producing electrical currents from oscillatory or varying traces recorded on a record medium containing a plurality of such traces in parallel relationship. More particularly, this invention relates to a method and apparatus for producing, from conventional seismic records, well logs or the like, electrical currents equivalent to the currents which produced the original record, and re-recording the same in a different form.

The copending application is directed to a method of regenerating electrical signals which have been recorded as traces on a record in side-by-side relationship. The method covered in the copending application involves: (1) scanning an incremental section of the record from a first reference line parallel to the traces to a second parallel reference line on the opposite side of the traces, (2) producing a time modulated signal whose modulations represent crossover points of the traces, (3) converting the time modulated signal to a plurality of width modulated pulses whose durations are proportional to the times of scansion to the traces, (4) routing each of the width modulated pulses to a separate output representing an individual one of the traces, (5) repeating the above steps to produce a plurality of output signals each containing a sequence of the width modulated pulses representative of a sequence of scanning operations of one of the traces, and (6) demodulating each of the output signals. The subject copending application is particularly directed to the reconstruction of seismic signals recorded in side-by-side relationship. In operating on seismic data, it is conventional to use A.C. coupling, for reasons obvious to those skilled in the art. This type of coupling prevents the D.C. components, introduced during the scanning step, from appearing as part of the regenerated seismic signals. However, for purposes other than seismic operations where A.C. coupling is not necessarily conventional it has been found desirable in many cases to include the step of stripping out the D.C. components and the present application is directed to cover this variation together with the basic invention.

In the early days of geophysical or seismic exploration, information was rerecorded as a visible oscillatory or varying trace by photographic means such as an oscilloscope or by the simple pen type recorder. More recently, seismic records have been recorded on magnetic tape because of the many advantages of magnetic tape recording, such as speed and economy of operation, flexibility, wide dynamic range, etc. Concomitantly with the development and use of magnetic recording in seismic exploration, various apparatuses adapted to interpret, evaluate, and replot in a variety of forms the information of the seismic record have also been developed. This equipment, which includes various forms of digital and analog computers, cross section plotters, synthetic seismogram plotters, and the like, is most simply designed and is best suited to operation on magnetically recorded records. Accordingly, significant problems arise when one wishes to restudy the older type seismic record or to operate on these records with newly developed interpretive machines or when one has seismic information of both the visible trace type and the magnetic record type in the same area and it is necessary to correlate these two diverse types of records. Thus, it is highly desirable to convert such oscillatory visible traces to a magnetic record and thereby facilitate the interpretation and evaluation of such records. In addition, and also because of the recent development of interpretive mechanisms, it is also often desirable to convert oscillatory traces contained on well logs to a magnetic record or some other diverse form.

At the present time all equipment suitable for reproducing the original currents from a record containing a plurality of visible traces follow each individual trace longitudinally. Such curve followers include both manual type followers and electrical or electronic type followers. In the case of the manual type follower, although it is the more accurate, the procedure is slow and expensive. On the other hand, the electrical or electronic type follower is somewhat less accurate; and its operation is complicated by the fact that the records sought to be reproduced have a plurality of timing lines or depth marker lines across the entire record transverse to the traces. Since such electrical or electronic followers are adapted to sense and follow a black or colored line and the traces, as well as the timing lines, are generally of the same color and the same shade, such curve followers will often depart from the curve or jump to another curve by following a timing line. This obviously will result in the production of an erroneous record.

It is, therefore, an object of the present invention to provide a method and apparatus for quickly and automatically producing oscillatory currents from a plurality of oscillatory or varying traces.

Another object of the present invention is to provide a method and apparatus for producing oscillatory currents from seismic records, well logs, and the like, containing a plurality of oscillatory or varying traces.

A still further object of the present invention is to provide a method and apparatus for producing oscillatory currents from records containing a plurality of oscillatory or varying traces and rerecording such currents in a different form than the original record.

Still another object of the present invention is to provide a method and apparatus for producing oscillatory currents from records containing a plurality of oscillatory or varying traces and rerecording these currents as a plurality of tracks on a ferromagnetic recording medium.

Briefly described, the present invention comprises a method and apparatus wherein a plurality of oscillatory traces are scanned transversely by means of a photoelectric scanning mechanism to produce a series of time-spaced pulses having the scansion time as the time base thereof and in which each pulse represents the distance traveled by the scanner from a reference line to the crossover point of a particular trace. These pulses are then differentiated and sent through a counter which converts the pulses to width modulated pulses and routes the width modulated pulses to individual outputs which correspond in number to the number of the original traces. Each output pulse thus represents the scansion crossing of each of the original traces; and as a plurality of scansions are added to appropriate outputs, pulse width modulated signals representative of each of the original traces are developed. These pulse width modulated signals are then passed through appropriate filters which selectively filter out the original signal variations and discard the scansion modulations. Thus, the output of the filter represents a plurality of signals equivalent to the signals which originally produced the oscillatory traces on the record. The resultant oscillatory signals may then be rerecorded on a ferromagnetic recording medium or in any other desired recording form.

The objects and advantages of applicant's invention will be more clearly illustrated by reference to the drawings.

FIGURE 2 illustrates a modified combination of components suitable for operating on seismic data, as well as on other types of data.

Figure 1:
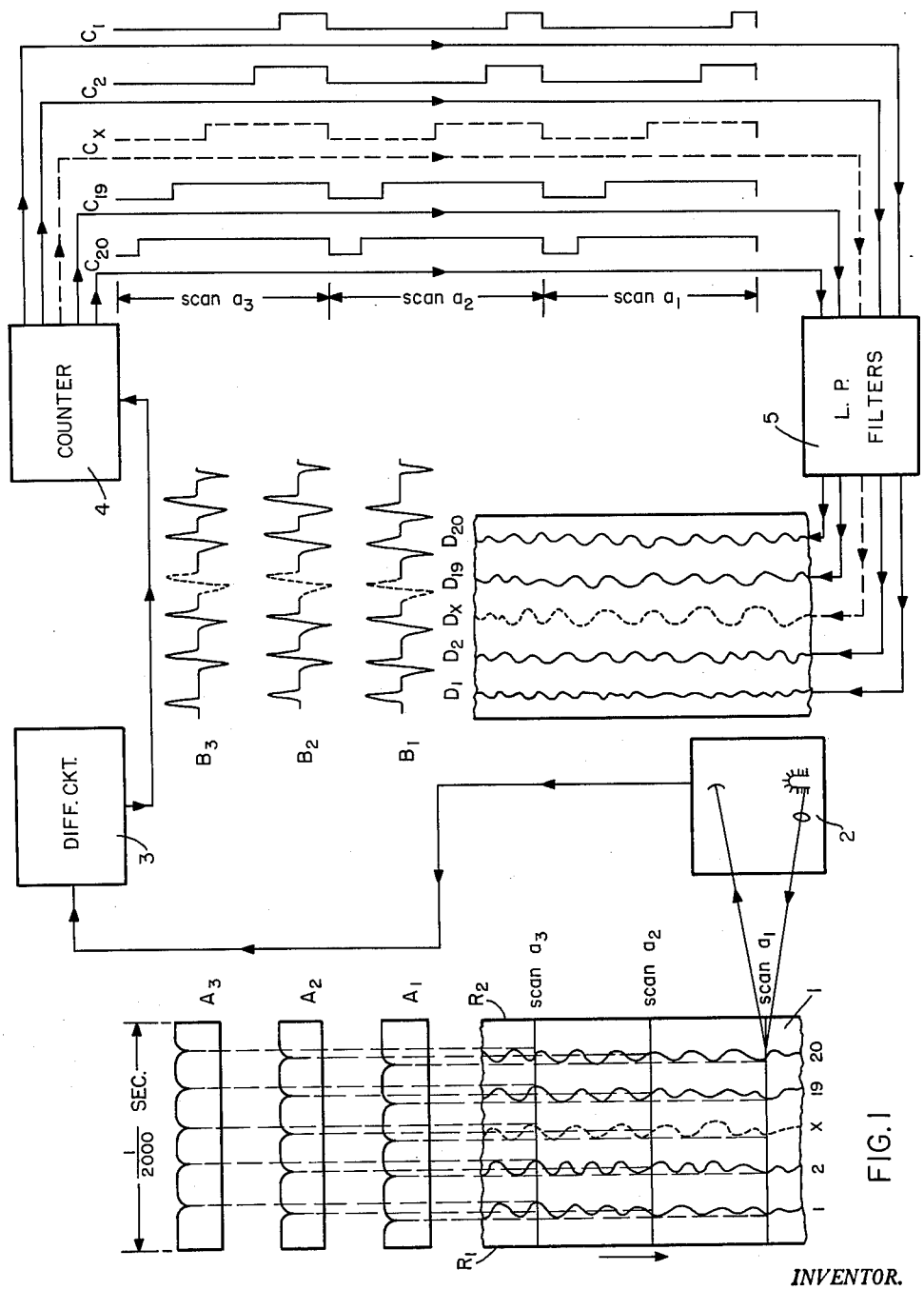
FIGURE 1 illustrates one combination of components suitable for operating on seismic data together with various waveforms produced by each component of the combination.

It should be understood that the waveforms illustrated in each figure are simplified and in some cases exaggerated for purposes of illustration and do not necessarily represent the actual waveform or an actual record.

Referring specifically to FIGURE 1, a portion of a seismic record having twenty traces thereon is designated as 1. As record 1 is moved either continuously or in discrete steps in the direction shown by the arrow, photoelectric unit 2 scans transversely across the traces, as indicated by scan lines $a_1$, $a_2$, and $a_3$, respectively. Such scansion of the record occurs between a reference line, designated as $R_1$ on record 1, parallel to the traces, and a second reference line, $R_2$, also parallel to the traces but on the opposite side thereof. Thus, scansion of the record is begun by initiating the scanned mechanism at line $R_1$, scanning to line $R_2$, and then rapidly returning to $R_1$. As the scanner crosses each of traces 1 through 20, a pulse is produced as each trace momentarily interrupts the beam of light. Accordingly, scansion waveforms $A_1$, $A_2$, and $A_3$ will be produced by scans $a_1$, $a_2$, and $a_3$, respectively. Trains of the waveforms or pulses $A_1$, $A_2$, and $A_3$ are fed to differentiating circuit 3, which produces a series of positive and negative going spikes along the scansion time base. In addition, the point of the beginning of the scansion is indicated by a large positive spike and the end of the scansion by a large negative spike. Accordingly, the output of differentiating circuit 3 will be illustrated by waveforms $B_1$, $B_2$, and $B_3$. These differentiated scansion trains are then sent to counter 4, which converts the time-spaced pulses to width modulated pulses and routes these width modulated pulses to an appropriate output which corresponds to an output for each of the original traces. For example, a signal of, say, ten volts in begun on each of the twenty output lines as the positive or start spike of waveform $B_1$ passes through the counter. These voltage are maintained constant until the first negative and positive going spike is reached, at which time the voltage to output $C_1$ is cut off to thus form a wide constant amplitude pulse. When the second spike of waveform $B_1$ is reached, the voltage of output $C_2$ is cut off, etc., until the last negative and positive going spike is reached, at which time the voltage of output $C_{20}$ is cut off. Now when scansion train $B_2$ passes through the counter, outputs $C_1$ through $C_{20}$ will be actuated; and each will be successively cut off as each of the successive negative and positive going spikes arrives. In the same manner the remaining pulses of waveforms $C_1$ through $C_{20}$ are formed from the remaining scansion trains, such as $B_3$. Waveforms $C_1$ through $C_{20}$ are then fed to low-pass filter 5, which is designed to pass signals having a frequency within the range of the original intelligence of record 1 and to reject the higher frequencies of scansion or modulation. Accordingly, the outputs of low-pass filters 5 will be a series of signals corresponding to the twenty signals which originally produced the twenty traces of record 1, which signals are indicated by waveforms $D_1$ through $D_{20}$.

As previously pointed out, the particular components of applicant's preferred apparatus are illustrative only; and various modifications can be made therein and various equivalent elements substituted therefor. Some of these equivalents and their essential operations will be pointed out hereinafter in the discussion of the circuit elements which follows.

Record

The record which can be scanned in accordance with the present invention includes any oscillatory trace, visible or nonvisible, and includes amplitude-varying signals, such as those shown in the figures, frequency modulated signals, and the like. The record may be transported in any well-known manner, either continuously or in discrete steps; however, because of the rapidity of scansion, the record is preferably moved continuously and at a speed approximately equal to the original recording speed.

Scanning device

Scanner 2 may be any suitable photoelectric cell designed to rapidly scan the record from a starting reference line to a terminal reference line and rapidly returned to the starting reference line to begin the second scan. For purposes of illustration, scanner 2 is shown as a conventional photoelectric cell and a light source in which either the light source or the photocell is adapted to transversely scan the record. During the scanning, light to the photocell is interrupted as it passes each of traces 1 through 20, it is then blanked out when it reaches reference line $R_2$ and returned to reference line $R_1$. Each time the light spot is momentarily interrupted, the scanner develops a current pulse across its output resistor (not shown). Therefore, during each scan the photocell develops a single pulse as the light crosses each of the traces. For purposes of explanation, it is assumed that the record is scanned in one two-thousandth of a second. That is to say that the scan frequency is two kilocycles. It is to be understood that the number of traces on the record and the scan frequency may vary from the numbers given without departing from the present invention. In the present instance, waveforms $A_1$, $A_2$, and $A_3$ are shown as a constant positive voltage which is interrupted by negative going pulses each time the spot of light is interrupted. Thus, waveforms $A_1$, $A_2$, and $A_3$ represent a train of pulses plotted against the scansion time base in which each successive pulse represents the time from reference line $R_1$ to each successive trace of record 1 or, in the alternative, the distance from reference line $R_1$ to the crossover point of each successive trace. Various scanning devices can be employed to produce this or similar results, and such devices are well known in the art. Applicant, however, prefers to employ as his scanning device a television camera which is modified so that it will scan an extremely narrow band of the record and be equivalent to a spot tracing a line across the record. Silimarly, if the traces of record 1 are not visible traces but are, for example, oscillating magnetic tracks, a scanner appropriate to that type of record would be employed.

Differentiating circuit

Differentiating circuit 3 receives pulse trains $A_1$, $A_2$, and $A_3$, respectively, in sequence and produces an output voltage the amplitude of which is proportional to the rate of change of the input voltage. As shown in waveforms $B_1$, $B_2$, and $B_3$, the output of the differentiating circuit contains a large positive spike or start pulse at the beginning, negative and positive going spikes representing the negative going spikes of waveforms $A_1$ through $A_3$ and spaced in time along the scansion time scale the same as the spikes of waveforms $A_1$ through $A_3$, and a large negative going pulse indicating the end of a scansion train.

Any conventional differentiating circuit may be emloyed for the performance of this step. It is to be understood, however, that the differentiating step is not absolutely necessary and can be eliminated if the scanner is designed so that its output pulses are sharp enough to trigger the counter circuit.

Counter circuit

The counting circuit receives the differentiated scansion trains in succession and, upon receipt of a start pulse, activates a plurality of outputs equivalent in number to the number of original traces. Then, as each successive negative and positive going spike of the scansion train arrives, each successive one of the outputs of counter 4 is terminated. Thereafter, as the next succeeding scansion train passes through the counter, the starting spike of waveforms B applies the specified voltage to each output, which is then terminated as each successive negative and positive going spike of that particular scansion train arrives. Accordingly, the ouput of counter 4 will consist of a plurality of width modulated signals corresponding in number to the number of original traces. The widths of each of the pulse waveforms C represent the distance from reference line $R_1$ of record 1 to the crossover of a trace. For example, signal $C_1$ shows three pulses which represent the crossovers of trace 1 of record 1 by scan lines $a_1$, $a_2$, and $a_3$, respectively.

Counting circuits suitable for use in accordance with the present invention are also well known in the art. Such circuits include electronic beam switching tubes, ring counters, and the like.

*Low-pass filters*

Low-pass filters 5 are designed to remove from signals $C_1$ through $C_{20}$ all modulation or scansion frequencies and pass only those frequencies representing the original intelligence of the traces of record 1. For example, in a seismic record, the original intelligence ordinarily does not exceed about 200 cycles per second; whereas in the examples given the scansion frequency is 2 kilocycles per second. Accordingly, an appropriate low-pass filter designed to cut off at about 200 cycles per second would be employed with each counter 4 output. Preferably, the low-pass filter is a constant-K type filter, but may be either of the T- or $\pi$-section type, designed to cut off at a frequency somewhere above the original range of frequencies recorded on the original record.

Refer now to FIGURE 2, which shows the FIGURE 1 device with slightly modified circuits 5', using optional recorder 6 to record the oscillatory signals detected by the LP filters in circuits 5'. In instances where the invention is regenerating other than seismic signals it still may be desirable to strip out the D.C. components introduced by scansion means 2 scanning from $R_1$ to each trace on record 1. The D.C. components can be stripped out in several well-known ways besides resorting to A.C. coupling as previously mentioned. For instance, if the regenerated signals are to be visually displayed by an oscilloscope, etc., or recorded in some manner, the D.C. components can be compensated for by conventional adjustments of the zero signal position of presentation means 6. Of course, the particular impedance matching and amplification requirements, to include position, number and type of amplifiers, are determined in a conventional manner by the type of filter in circuit 5' and the type of circuit following each circuit 5'. If for some reason D.C. amplifiers are used in place of A.C. coupled amplifiers and the outputs of circuits 5' are to be operated on by circuits other than presentation means 6, or it is not desirable to use the zero signal adjust on the presentation means, the D.C. components can be stripped out by using transformer or other conventional A.C. couplings in a well-known manner to connect the output of each circuit 5' to its next succeeding stage. In any event, if the D.C. components are to be stripped out instead of being compensated for by a zero signal level adjustment on a presentation means a conventional A.C. coupling or A.C. coupled amplifier is placed between each LP filter and the stage succeeding circuit 5' in a conventional manner. In instances where it is desirable to use a band pass filter to pass a selected range of particular frequencies, highpass filters 5'', FIGURE 2, can be added to the LP filter amplifier circuits 5' in a manner well-known to those skilled in the art.

Of course, it should be understood that in cases where the retention of the D.C. components is not objectionable (position of the zero signal level is not critical) or is even desirable, the original oscillatory traces can be recorded with their respective D.C. components by using D.C. coupling.

From the foregoing it is to be observed that applicant has provided a novel method and apparatus for producing oscillatory or varying currents from a plurality of oscillatory or varying traces, which method and apparatus is not only simple and automatic but accurately reproduces the original intelligence without the attendant disadvantages of the curve followers in the prior art.

While particular modifications have been described herein, further modifications and substitutions of equivalents will be obvious to one skilled in the art; and, therefore, applicant does not wish to be limited to the modifications and equivalents set forth herein. For example, while a specific example given herein sets a scansion frequency of 2 kilocycles and a filter cutoff frequency of 200 cycles, these two frequencies may be reversed so long as they can be adequately separated to produce the final signals. In other words, if the original intelligence of the record is of an extremely high frequency, it may be desirable to have a slower scanning rate and to use a high-pass or even a band-pass filter for ultimate separation of the scansion frequencies from the frequencies of the original traces. Therefore, in view of the above, the scope of the subject invention is only limited by the claims set forth below.

I claim:

1. A method for producing oscillatory electrical signals from a plurality of oscillatory traces recorded in side-by-side relationship on a record medium comprising scanning an incremental section of said record from a first reference line parallel to said traces to a second reference line on the opposite side of said traces and also parallel thereto, producing a train of time-spaced pulses along a time scale proportional to the scansion time, each of said pulses representing the crossover point of one of said traces by the scansion means, separating said train of pulse into individual pulses, converting each of said individual pulses to a constant amplitude pulse whose duration is proportional to the scansion time from said first reference line to the crossover point of that trace which created the pulse in question, applying each of said constant amplitude pulses to an individual output representing an individual one of said traces, repeating the above steps to produce a plurality of output signals each containing a sequence of said constant amplitude pulses representative of a sequence of scanning operations of one of said traces, and removing from said output signals those oscillatory variations introduced by the previous steps.

2. A method in accordance with claim 1 wherein D.C. components introduced by the previous steps are removed from the output signals.

3. A method in accordance with claim 1 wherein the pulses of the train of time spaced pulses are reformed to generate pulses adapted to operate a sequential switching means.

4. A method in accordance with claim 1 wherein all oscillatory variations having a frequency above the highest frequency of oscillatory variations of the traces are removed from the output signals.

5. A method in accordance with claim 1 wherein all oscillatory variations having frequencies above and below the range of frequencies of oscillatory variations of the traces are removed from the output signals.

6. A method in accordance with claim 1 wherein the output signals are rerecorded on a ferromagnetic record medium.

7. A method for producing oscillatory electrical signals from a plurality of seismic traces recorded in side-by-side relationship on a record medium comprising scanning an incremental section of said record from a first reference line parallel to said traces to a second reference line on the opposite side of said traces and also parallel thereto, producing a train of time spaced pulses along a time scale proportional to the scansion time, each of said pulses representing the crossover point of one of said traces by the scansion means, separating said train of pulses into individual pulses, converting each of said individual pulses to a constant amplitude pulse whose duration is proportional to the scansion time from said first reference line to the crossover point of that trace which created the pulse in question, applying each of said constant amplitude pulses to an individual output representing an individual one of said traces, repeating the above steps to produce a plurality of output signals each containing a sequence of said constant amplitude pulses representative of a sequence of scanning operations of one of said traces, and removing from said output signals those oscillatory variations introduced by the previous steps.

8. A method in accordance with claim 7 wherein the scanning operation is repeated at a rate of 2,000 times per second of time along the record medium.

9. A method in accordance with claim 7 wherein all oscillatory variations above 200 cycles per second are removed from the output signals.

10. A method for producing oscillatory electrical signals from a plurality of oscillatory traces recorded in side-by-side relationship on a record medium comprising scanning an incremental section of said record from a first reference line parallel to said traces to a second reference line on the opposite side of said traces and also parallel thereto, producing an output signal pulsed in time such that said pulsing represents the times of crossover of said traces by the scansion means, applying a constant amplitude signal to a plurality of outputs equal in number to and representative of each of said traces, cutting off said signals to each of said outputs in response to each successive time spaced pulse, repeating the above steps to produce a plurality of output signals each containing a sequence of constant amplitude pulses representative of a sequence of scanning operations of one of said traces, and removing from said output signals those oscillatory variations introduced by the previous steps.

11. A method of regenerating, from a record medium carrying a plurality of oscillatory traces in side-by-side relationship, the electrical currents which produced said traces comprising scanning said record transverse to the length of said traces, producing a time modulated signal whose modulations represent crossover points of said traces, converting said time modulated signal to a plurality of width modulated pulses whose durations are proportional to the times of scansion to said traces, routing each of said width modulated pulses to a separate output representative of the particular one of said traces from which the pulse in question originated, repeating the above steps at a constant frequency, and demodulating each of said outputs.

12. Apparatus for producing oscillatory electrical signals from a plurality of oscillatory traces recorded in side-by-side relationship on a record medium comprising scansion means adapted to scan said record medium transverse to the length of said traces and produce an output pulse each time one of said traces is crossed; counter means adapted to separate said pulses, produce constant amplitude output pulses whose durations are proportional to the scansion time to the crossover point of each of said traces and apply each said constant amplitude pulse to a separate output representing an individual one of said traces; and filter means adapted to remove from outputs the oscillatory variations introduced by said scansion means and said counter means.

13. Apparatus in accordance with claim 12 which includes differentiating means electrically connected between said scansion means and said counter means.

14. Apparatus in accordance with claim 12 wherein the scansion means is an optical scanner.

15. Apparatus in accordance with claim 12 wherein the counter means is an electronic beam switching tube.

16. Apparatus in accordance with claim 12 wherein the filter means is a low-pass filter.

17. A method for producing oscillatory electrical signals from a plurality of oscillatory traces recorded in side-by-side relationship on a record medium comprising scanning an incremental section of said record from a given reference trace, producing a train of time-spaced pulses along a time scale proportional to the scansion time, each of said pulses representing the crossover point of one of said traces by the scansion means, separating said train of pulses into individual pulses, converting each of said individual pulses to a width modulated pulse whose duration is proportional to the scansion time from said reference trace to the crossover point of that trace which created the pulse in question, applying each of said modulated pulses to an individual output representing an individual one of said traces, repeating the above steps to produce a plurality of output signals each containing a sequence of said modulated pulses representative of a sequence of scanning operations of one of said traces, and removing from said output signals those oscillatory variations introduced by the previous steps to obtain a plurality of oscillatory electrical signals which are analogs of said oscillatory traces.

18. A method for generating an electrical signal from a trace graphically recorded on a surface which includes sequentially scanning said surface through a series of positions incrementally displaced along said trace, sensing passage of each scan across said trace to determine the passage time of each said scan as it crosses said trace, generating a series of electrical pulses, one for each scan, each said pulse having a time length which is a function of said passage time for the scan associated with such pulse, low pass filtering said series of pulses and thereafter amplifying with an A.C. amplifier said filtered pulses thereby obtained to produce an electrical signal having amplitude variations corresponding to the shape of said trace.

19. A method according to claim 18 in which said trace is a continuous curve displaying selected information or data with reference to a linear base line, and in which each successive scan is incrementally displaced along said base line.

20. An apparatus for generating an electrical signal from a trace graphically recorded on a surface, which apparatus includes means for sequentially scanning a point of light across said surface through a series of positions incrementally displaced along said trace, light sensitive means positioned to sense absorption of light as each said scan crosses said trace to determine the passage time of each scan of said point of light as it crosses said trace, means generating a series of electrical pulses, one for each scan of said point of light, said pulse generating means being operatively coupled with said light sensitive means whereby the time length of each pulse is a function of said sensed passage time for the associated scan of said point of light, low pass filter means having a continuous electrical output and operatively coupled with said pulse generating means, and A.C. amplifier means having a continuous electrical output and operatively coupled to the output of said low pass filter means whereby said electrical output of said A.C. amplifier means is a function of said trace.

References Cited by the Examiner

UNITED STATES PATENTS 3,033,990  5/62  Johnson _____ 340—15.5 X

SAMUEL FEINBERG, *Primary Examiner.*

CHESTER L. JUSTUS, *Examiner.*

UNITED STATES PATENT OFFICE
CERTIFICATE OF CORRECTION

Patent No. 3,209,321                  September 28, 1965

John P. Woods

It is hereby certified that error appears in the above numbered patent requiring correction and that the said Letters Patent should read as corrected below.

Column 3, line 44, for "in" read -- is --; line 46, for "voltage" read -- voltages --; column 5, line 13, for "pulse" read -- pulses of --; column 6, line 40, for "pulse" read -- pulses --.

Signed and sealed this 7th day of June 1966.

(SEAL)
Attest:

ERNEST W. SWIDER                  EDWARD J. BRENNER
Attesting Officer                 Commissioner of Patents